United States Patent [19]
Polacheck et al.

[11] 3,938,541
[45] Feb. 17, 1976

[54] SHAFT SEAL FOR A CHECK VALVE
[75] Inventors: James R. Polacheck, Wayne; Gilbert F. Hyde, Swarthmore, both of Pa.
[73] Assignee: Westinghouse Electric Corporation, Pittsburgh, Pa.
[22] Filed: Jan. 25, 1974
[21] Appl. No.: 436,590

[52] U.S. Cl. ............... 137/239; 137/242; 251/214; 251/298; 251/228; 277/24
[51] Int. Cl.² ........................................ F16K 41/16
[58] Field of Search ............ 137/527, 527.2, 527.4, 137/527.6, 527.8, 237, 238, 239, 241, 242; 251/214, 298, 299, 303, 304, 228; 277/24, 134

[56] References Cited
UNITED STATES PATENTS

| | | | |
|---|---|---|---|
| 2,833,511 | 5/1958 | Fletcher | 251/298 X |
| 3,106,220 | 10/1963 | Hose | 137/527.8 X |
| 3,254,660 | 6/1966 | Ray | 251/228 X |
| 3,669,460 | 6/1972 | Wysong | 277/24 |

Primary Examiner—William R. Cline
Attorney, Agent, or Firm—George M. Medwick

[57] ABSTRACT

A shaft seal for a check valve having a shaft rotatably disposed within a valve housing. The shaft seal is disposed within a recess defined within the interior of the valve housing between a bushing member and the shaft. Disposition of the seal within the recess permits accumulation of foreign matter precipitate to occur without deleterious clogging of the clearances between the shaft and the bushing, thus permitting free rotational movement of the shaft. A plurality of sharp-edged grooves disposed on the surface of the shaft provide a flow path for guiding the foreign matter precipitate into the recess. A flushing fluid opening is provided within the valve housing to permit introduction of a flushing fluid into the body recess.

9 Claims, 4 Drawing Figures

SHAFT SEAL FOR A CHECK VALVE

BACKGROUND OF THE INVENTION

1. Field of the Invention

This invention relates to check valves, and in particular, to an improved shaft seal for use on a check valve.

2. Description of the Prior Art

It is well known in the nuclear steam power generation art that water used in the closed turbine loop of a nuclear steam power plant must be chemically treated through the addition of certain additives. Such additives, including phosphates, are required in order to provide protection for the materials utilized to fabricate the various elements comprising the closed turbine loop. Such protection is especially required in order to protect the material used to fabricate the steam generator element from deleterious effects caused by passage therethrough of overly caustic secondary water.

Of particular benefit is phosphate, which, when added to the secondary water, combines with free hydrogen molecules carried therein to prevent the secondary water from becoming overly caustic and thus to prevent damage to the metals used in fabricating various elements of the closed turbine loop. However, as is well known to those skilled in the art, phosphate is soluble in water. Thus, phosphate is carried by the moisture in the steam throughout the entire system. The presence of phosphate in solution is troublesome in valving, and is especially troublesome within the turbine main stop valve.

The turbine main stop valve is usually a clapper or a check type valve which is utilized in series with a plug-throttle valve. Both the check valve and the plug valve are usually interposed between the steam generator and the turbine elements of the closed turbine loop. The plug-throttle valve is a non-zero leakage valve which indicates that some leakage flow can occur therethrough. Thus the primary cut-off function devolves upon the check or clapper valve. If this valve fails, the possibility of damage to the turbine element due to occurrence of an overspeed condition increases.

The present clapper valve has a valve shaft rotatably disposed within a valve housing. The valve shaft supports a valve disc which moves from an open to a seated position within a valve chamber defined by the interior of the housing. A bushing member is tightly fitted about the shaft between the housing and the shaft. A leakoff gland is disposed within the housing. The leakoff gland is connected to a condenser element and is typically at a pressure lower than that of the atmosphere.

Presently, sealing means are disposed between the shaft and the bushing at a point on the valve shaft adjacent the bushing yet still within the valve chamber. With the valve disc in the open position, the seal is fully engaged, and thus a flow of steam from the valve chamber to the gland condenser is to be prevented by the shaft sealing means.

However, the shaft seal as presently employed at time does not seal effectively. As a result, a flow of steam passes from the valve chamber, through the close clearance between the valve shaft and the bushing, to the leakoff. It is well known to those skilled in the thermodynamic art, that the throttling of wet steam from a first pressure to a lower pressure in the presence of a constant temperature will drive the steam into the superheat region. It is also well known that steam in the superheat region is unable to hold materials carried in solution thereby. Since the steam which leaks past the present shaft seal in check valves contains dissolved foreign matter, especially phosphate, in solution, the throttling of such leakage steam at the present seal interfaces results in the deposition of phosphate precipitate adjacent to the location of the shaft and the present bushing.

Such deposition of phosphate precipitate accumulates and eventually causes the narrow clearances between the shaft and the bushing to close. It is apparent that such accumulation of phosphate precipitates increases the amount of torque required to close the valve. In practice, it has been observed that the deposits are sufficient to cause the valve to fail to operate entirely. Such accumulation of phosphate precipitates are usually insidious, in that the effect of their accumulation is not known or discernible by any method other than an attempt to close the valve.

The buildup of such deposits can be eliminated in a variety of ways. Provision of a better shaft seal, for example, so that a leakage flow does not occur will solve the problem. However, provision of a perfect sealing device between a rotatable shaft and a shaft support is very difficult.

The problem may also be overcome by eliminating the moisture content in the steam supply or eliminating the presence of foreign matter within the secondary water. Since total elimination of the moisture content in the steam supply is also an untenable solution, the remaining alternative is to eliminate the presence of foreign matter from the secondary water. But as mentioned above, this solution is impractical since it would also eliminate the method by which the metals used to fabricate various elements in the closed turbine loop are protected from caustic agents.

SUMMARY OF THE INVENTION

This invention discloses an improved shaft seal for a check valve. The seal interface is provided by abutting corresponding surfaces of a shoulder located on the bushing with a journal located on the valve shaft. The seal interface is disposed within a recess defined between the bushing and the shaft. The recess provides an accumulation volume having a relatively large clearance between the shaft and the bushing in order to accommodate deposition of foreign matter precipitates which occur due to throttling of the leakage flow at the seal interface.

In addition, a plurality of spiral grooves is disposed on the surface of the shaft and provides communication between the recess and the valve chamber. Such grooves have a sharp cutting edge thereon and provide a flow path for high velocity leakage flow to carry precipitates into the recess. A fluid flush opening is provided within the valve housing to permit introduction of a flushing fluid into the recess.

It is an object of this invention to provide a shaft seal device for a check valve and to dispose this shaft seal within a body recess large enough to permit accumulation of precipitated foreign matter without impairing operation of the valve itself.

BRIEF DESCRIPTION OF THE DRAWINGS

The invention will be more fully understood from the following detailed description taken in connection with the accompanying drawings, in which.

DESCRIPTION OF THE PREFERRED EMBODIMENT

Figure 1:
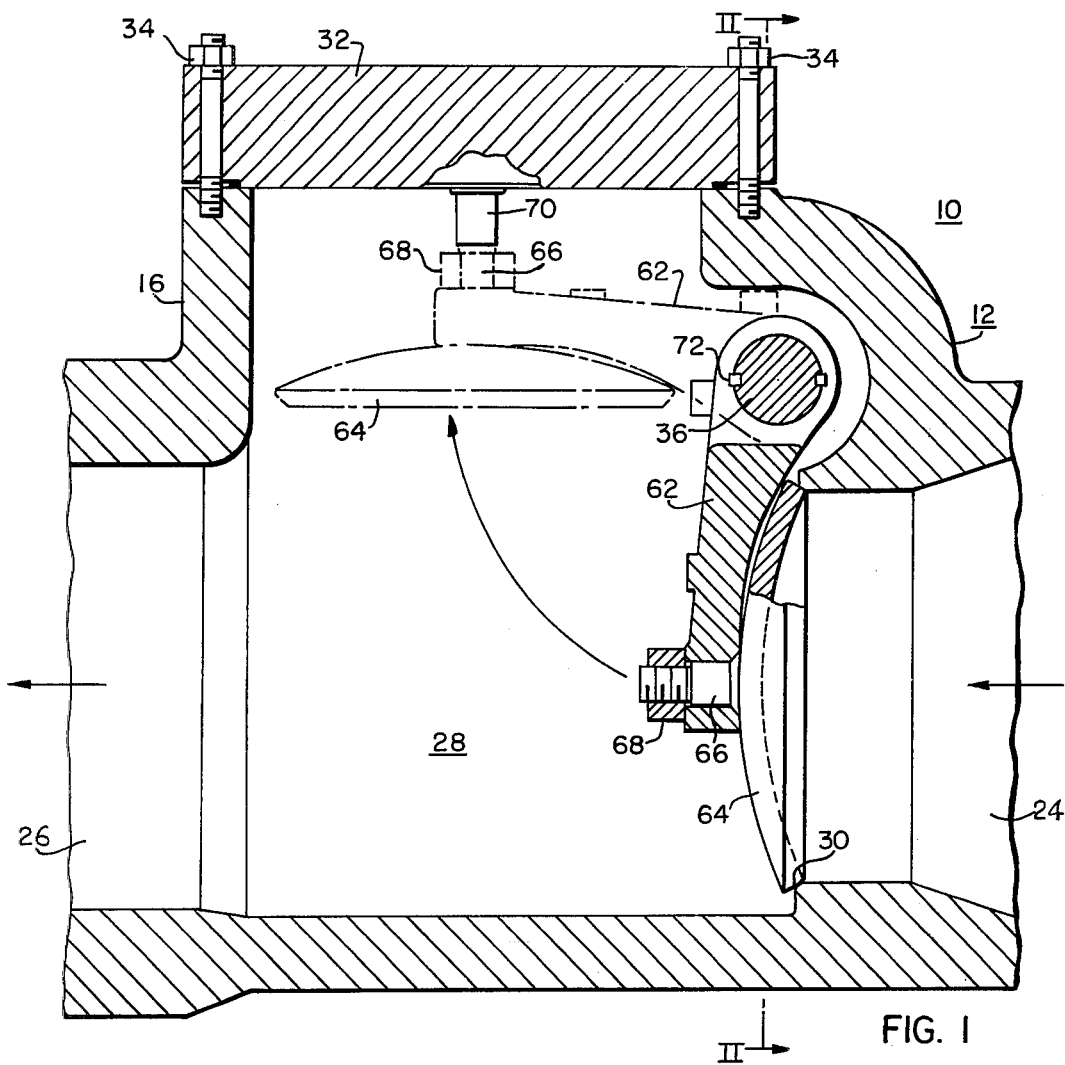
FIG. 1 is a sectional view of a check valve constructed according to the teachings of the invention.

Throughout the following description, similar reference characters refer to similar elements in all figures of the drawings.

Figure 2:
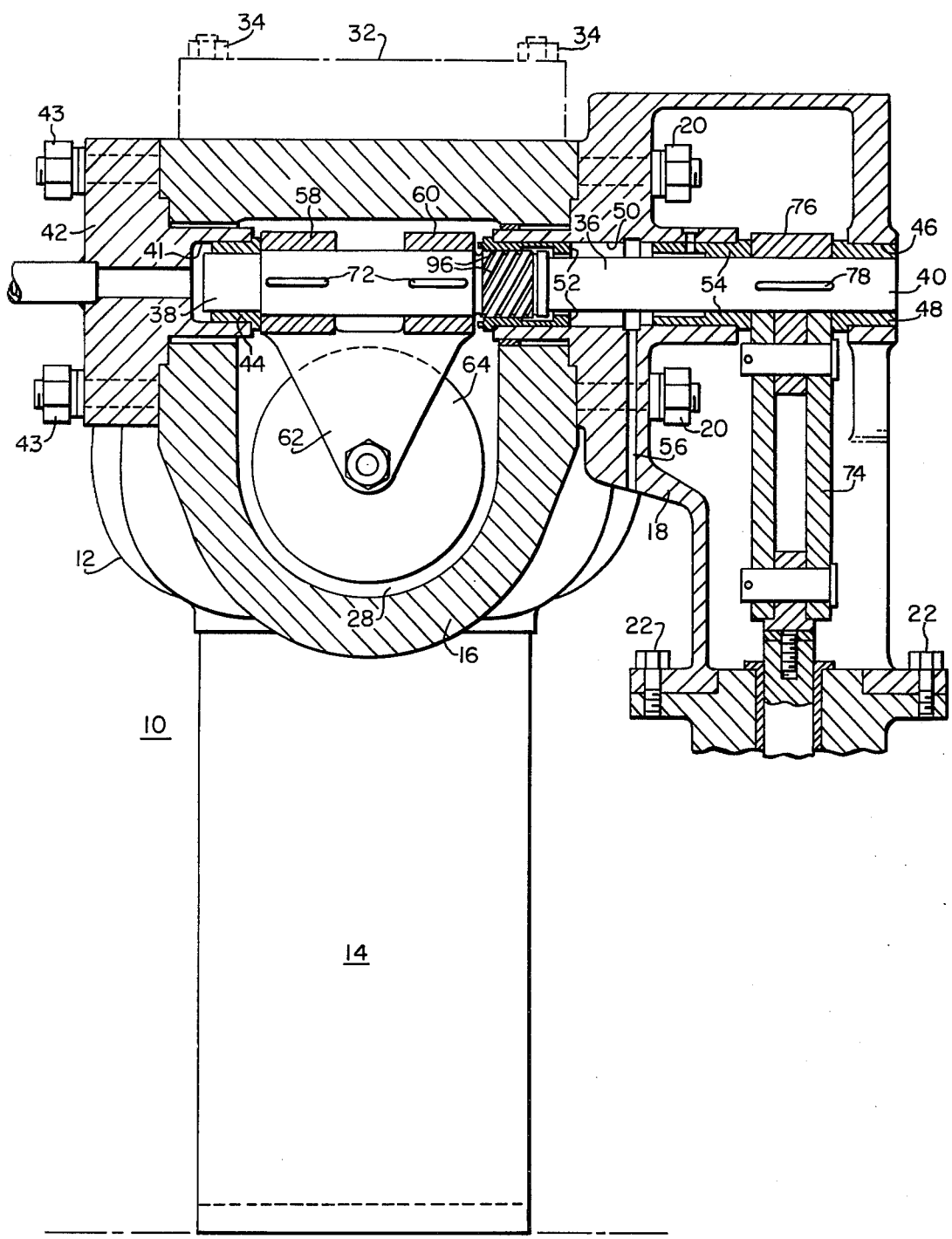
FIG. 2 is a sectional view taken along line II—II in FIG. 1.

Referring now to FIGS. 1 and 2 of the drawings, sectional views of a check valve 10 embodying the teachings of this invention are illustrated. In the figures, the check valve 10 has a valve casing generally indicated by reference numeral 12 mounted on a support pedestal 14. The valve casing 12 comprises a valve chamber housing member 16 and a valve servo support housing member 18. The valve chamber housing member 16 and the valve servo support housing member 18 are securely fastened together by suitable fastening means, such as studs and nuts 20. Suitable valve control means such as a valve servo (not shown) is mounted onto the servo support housing 18 by mounting bolts 22. Although fabrication considerations dictate the use of a valve chamber housing member 16 and a valve servo support housing member 18, it is to be understood that these aforementioned housing members provide an integrated valve casing 12 supporting and protecting the interior components of the check valve 10.

The valve chamber housing member 16 defines an inlet orifice 24 and an outlet orifice 26, both the inlet 24 and the outlet 26 communicate with a valve chamber 28 disposed within the valve chamber housing member 16. A valve seat 30 is disposed on the interior of the valve chamber housing member 16 adjacent the outlet 26. For ease of of assembly, the valve chamber housing member 16 is open at the top and has a top cover plate 32 secured thereto by suitable attachment means, such as studs and nuts 34.

A valve shaft 36, having a first end 38 and a second end 40 (FIG. 2) is rotatably supported within the valve casing 12. The first end 38 of the valve shaft 36, which is the left-hand end of the shaft 36 as viewed in the drawings, is rotatably mounted within a support aperture 41 disposed within a bearing cover 42. The bearing cover 42 is attached to the valve chamber housing member 16 by suitable attachment means, such as studs and nuts 43. A first bushing 44 surrounds that portion of the shaft 36 which is supported within the aperture 41.

The second end 40 of the shaft 36, which is the right-hand end of the shaft 36 as viewed in the drawings, is rotatably supported within an aperture 46 within the servo support housing member 18. A second bushing 48 surrounds that portion of the shaft 36 which is supported within the aperture 46.

The shaft 36 extends through a bore 50 which is disposed through the servo support housing member 18. The bore 50 is lined with a first straight bushing 52 and a second straight bushing 54. The first straight bushing 52 is disposed in the bore 50 adjacent to the valve chamber 28. Both bushings 52 and 54 are tightly fitted within the bore 50.

A leak-off orifice 56 is disposed within the valve servo support housing member 18 and is connected to a condenser element (not shown). The condenser element is typically maintained at a pressure lower than that of the atmosphere.

Within the valve chamber 28, the valve shaft 36 is surrounded by a first collar portion 58 and a second collar portion 60 of a valve arm member 62. The first collar portion 58 surrounds the shaft 36 adjacent the first bushing 44. The second collar portion 60 surrounds the shaft 36 adjacent to the first straight bushing 52.

As best seen in FIG. 1, the valve arm portion 62 is attached within the valve chamber 28 to a valve disc member 64. The disc member 64 has a stem 66 protruding from the backside thereof. The stem 66 engages the valve arm 62 and both the stem 66 and the valve arm 62 are securely affixed by suitable attachment means such as a nut 68.

The valve disc 64 is movable within the valve chamber 28 from an open position to a seated position. When in the open position within the valve chamber 28, as illustrated by the dotted line in FIG. 1, the stem 66 abuts against a valve stop 70 disposed within the top cover plate 32. When in the seated position within the valve chamber 28, the valve disc 64 contacts the valve seat 30 and isolates the inlet orifice 24 from the outlet orifice 26.

As best shown in FIG. 2, the valve arm 62 is secured to the valve shaft 36 by key members 72. In addition, the valve shaft 36 is secured to a servo linkage 74 near the second end 40 of the shaft 36. The servo linkage 74 is fastened to the shaft 36 through a shaft collar 76 and servo keys 78.

It is thus apparent that the valve disc 64 is movable from an open to a seated position within the valve chamber 28 in response to a predetermined signal from a valve control means (not shown). The valve control means initiates an appropriate signal to the servo linkage 74. The linkage 74 transmits a force to the valve shaft 36 through the shaft collar 76 which is affixed to the shaft 36 by the servo keys 78. The force is transmitted from the shaft 36 to the valve disc 64 through the key members 72 to the valve arm 62. As seen from FIG. 1, a rotation of the valve shaft 36 through an arc of 90° will move the valve disc 64 from the open to the seated position within the valve chamber 28.

When mounted within the closed turbine loop, comprising, at least, a series configuration of turbine elements, condenser, reheater and steam generator (not shown), the check valve 10 is utilized as a turbine main stop valve. The check valve 10 is usually utilized in conjunction with a plug-throttle valve. However, the plug-throttle valve is a non-zero leakage valve and for this reason is not suitably adapted for use as a turbine stop valve. Thus, the primary cutoff function of stopping the flow of elastic fluid passing from the steam generator into the turbine elements is performed by the zero leakage check valve 10.

It is well known to those skilled in the nuclear steam generator art that certain chemical substances are added to the secondary water utilized in the steam side of a nuclear steam power plant in order to inhibit deleterious effects to the metals used to fabricate the various elements of the closed turbine loop. Such precautions are especially necessary to protect the materials used to fabricate the steam generator element disposed within the turbine loop.

However, some of the chemical additives, especially phosphate, are soluble in water, and are thus carried through the closed turbine system by the moisture within the steam. The phosphates combine with the free hydrogen available within the secondary water to limit the acidity of the secondary water, and thus protect the metal used to fabricate the elements comprising the steam system.

In the prior art, a shaft seal is disposed between the shaft and the first straight bushing. The seal is disposed about the shaft between the second collar of the valve arm and the first straight bushing. The prior art seal is comprised of a stellite ring surrounding the valve shaft and a spherical washer disposed about the valve shaft adjacent to the first straight bushing. The seal faces in the prior art seal occurred at the interface between the stellite ring and the spherical washer and at the interface of the spherical washer and the first straight bushing. In addition, the stellite ring, although it is shrunk-fit on the shaft, often becomes loose and results in a third seal face which occurs at the interface of the shaft and the stellite ring. It can be appreciated that the present seal used in the prior art check valve is not completely effective.

Since the prior art seals are not completely effective, a flow of saturated steam carrying foreign matter in solution therewith passes between the valve chamber and the leakoff disposed within the valve casing. Since the seal is ineffective, and since there is a steam flow past the seal, a throttling effect occurs at the present seal faces. The effect of throttling the wet steam from the steam generator across the seal faces with a constant temperature results in driving the steam into the superheated region. Steam in the superheated region cannot maintain phosphates and other foreign matters in the solution. Thus, when the wet stream is throttled across the seal face adjacent the first straight bushing, the steam becomes superheated and the phosphate carried therein precipitates out. Continued precipitation results in an accumulation of foreign matter, commonly phosphates, in the area of the prior art shaft seal. Such an accumulation has the effect of inhibiting rotation of the shaft whith the attendant possibility that the valve disc will be unable to move from the open to the seated position within the valve chamber.

Several methods of circumventing the problem have been suggested by the prior art. For example, provision of a better shaft seal at the present seal location has been suggested. Also, if either the moisture content of the steam flow or the phosphate content of the secondary water within the steam system were eliminated, the problem can be overriden.

However, both fabrication of a perfect shaft seal is the space provided or the total elimination of moisture from the main steam supply are very difficult with the current state of the art. Also, for reasons explained above, the phosphates and other chemical treatments cannot be eliminated from the secondary water. It is therefore an object of this invention to provide an improved shaft seal and to locate this improved shaft seal in a position within the valve casing 12 so as to provide a sufficient volume to accommodate accumulation of phosphate and other foreign deposits if they should develop and preclude such accumulation from detrimentally affecting operation of the check valve 10.

Figure 3:
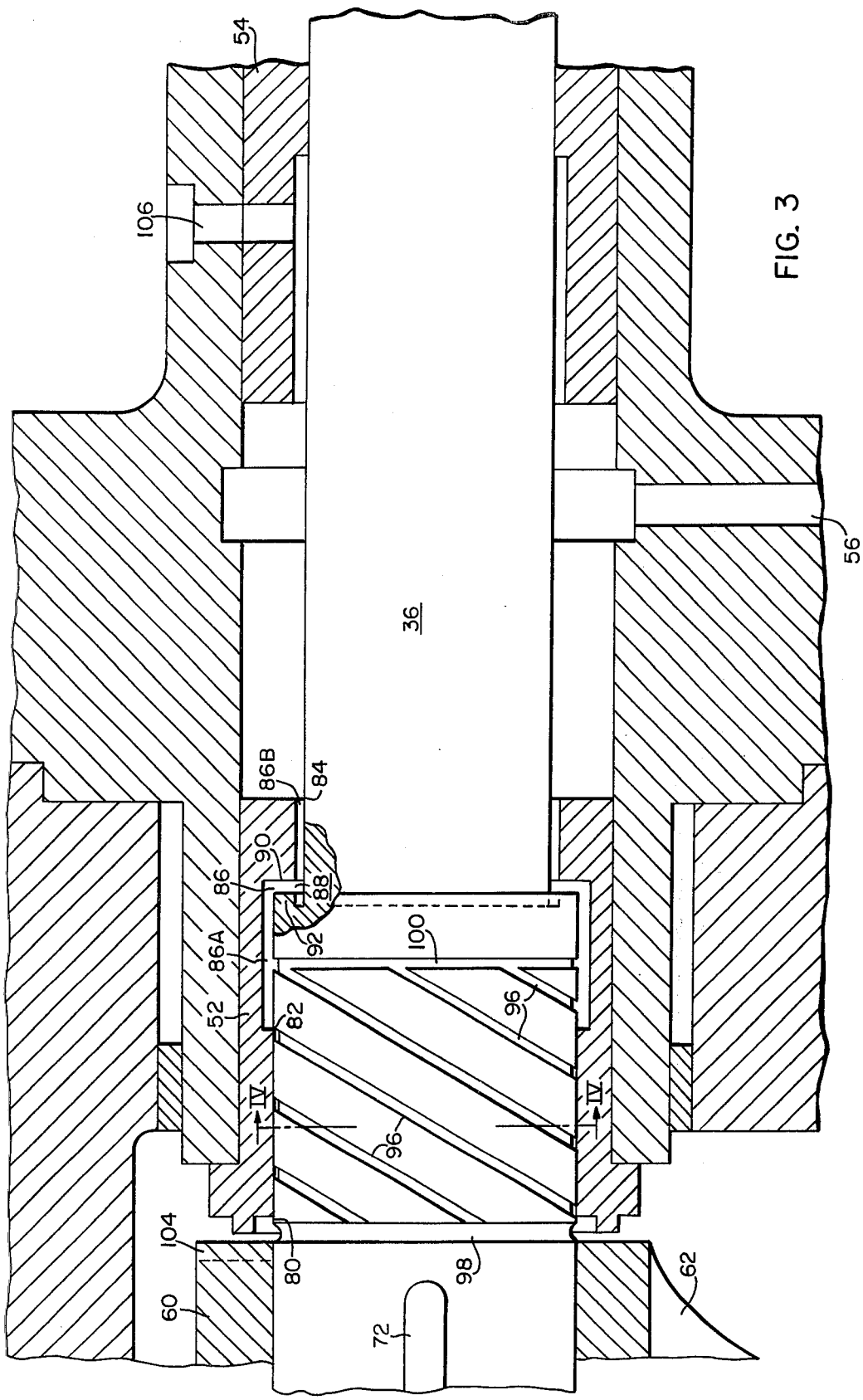
FIG. 3 is an expanded view of a portion of FIG. 2.

Referring now to FIG. 3, an expanded view of a portion of the check valve 10 shown in FIG. 2 is illustrated. In FIG. 3, a shaft seal embodying the teachings of this invention and overcoming the problem of deposition of foreign matter along the shaft is illustrated.

As seen in FIG. 3, the first straight bushing 52 is shown as having a first axial portion being within a first predetermined tolerance of the shaft 36 from a first point 80 to a second point 82 along the shaft 36. The shaft 36 and the first straight bushing 52 are in mutual contact between the first point 80 and the second point 82. From the second point 82 to a third point 84 the shaft 36 and the first straight bushing 52, a second axial portion of the bushing 52 are within a second predetermined tolerance of each other.

In FIG. 3, the first axial portion of the bushing 52 fits the shaft 36 with a closer tolerance than the second axial portion of the bushing fits the shaft. That is, the distance, or tolerance, between the second axial portion of the bushing 52 and the shaft 36 is greater than the distance between the first axial portion of the bushing 52 and the shaft 36. From the second point 82 to the third point 84, the shaft 36 and the first straight bushing 52 define a recessed area 86. The recess 86 communicates with the gland leakoff 56 which is disposed within the valve casing 12.

A shaft seal generally indicated at 88 is disposed between the shaft 36 and the first straight bushing 52. The seal 88 is disposed within the recess 86 and comprises the interface between a shoulder 90 on the straight bushing 52 and a journal 92 located on the shaft 36 as seen in FIG. 3. The seal 88 disposed within the recess 86 divides the recess 86 into a first region 86A and a second region 86B. The first recess region 86A appears to the left of the seal 88 while the second recess region 86B appears to the right of the seal 88, when viewed in FIG. 3. The seal 88 between the shoulder 90 and the journal 92 is established when the valve disc 64 occupies the open position (FIG. 1).

The seal 88 taught by this invention has only one seal interface resulting from the contact of the shoulder 90 of the first straight bushing 52 and the journal 92 of the shaft 36. It is well known to those skilled in the seal art that the probability of seal failure is directly proportional to the number of seal faces utilized by the seal in question. It is apparent then, that by reducing the number of seal faces in the seal 88 taught by this invention to one, the shaft seal between the shaft 36 and the first bushing 52 will be improved over the seal utilized by the prior art.

Since the seal 88 is located within the recess 86, and is thus disposed downstream of the position of the seal in the prior art, the stellite ring and the spherical washer which were necessary elements of the seal heretofore used have been eliminated. It is apparent from an examination of FIG. 2 that the shaft 36 is subjected to a bending load at two places thereon. The shaft 36 is subjected to a bending load adjacent the second end 40 because the coupling between the servo links 74 and the shaft 36 occur near the second end 40. The shaft 36 is also subjected to a bending stress near the points of attachment of the valve arm 62 to the shaft 36. Thus, in the prior art, the shaft seal is located adjacent a point of application of bending stress to the shaft 36. Since this is so, the spherical washer is needed to allow for the shaft 36 to deflect and still mate with the first bushing 52. However, since the seal 88 taught by this invention is located at a point along the shaft 36 where the shaft deflection is restricted the need for a spherical washer element in the shaft seal is eliminated.

In addition to the improvement in sealing which is provided by only one seal interface, location of the shaft seal 88 within the recess 86 has an added improvement over the shaft seal utilized by the prior art. Assuming that the shaft seal 88 provided by the teachings of this invention is not a perfect seal, some leakage flow from the valve chamber 28 to the sub-atmospheric leakoff 56 is to be expected. Since this leakage flow will contain precipitate in solution, the throttling effect across the shaft seal 88 will occur adjacent the shaft seal 88 and thus precipitate matter caused by such throttling will be deposited within the recess 86, either in the recess region 86A to the left of the seal interface 88 or in the recess region 86B which is disposed to the right of the seal 88.

Steam which leaks from within the valve chamber 28 through the close tolerance between the shaft 36 and the first bushing 52 will not be driven into the superheated region. Therefore, any phosphates carried in solution in the moisture of the steam remain in solution until throttling occurs adjacent the seal 88 located within the recess regions 86A and 86B. Since precipitation of the phosphates in solution will occur adjacent the seal 88, the result of accumulation in the larger tolerances of the recess regions 86A and 86B will be less deleterious than the accumulation of the phosphates which have occurred to valves in the prior art.

It is seen that since the phosphate will precipitate within the larger recess regions 86A and 86B, the accumulation of such phosphates will not interfere with the operation of a valve embodying the teachings of this invention to the extent such accumulations affect valve operation in the prior art. A valve utilizing a seal disposed before the first bushing would, as in the prior art, tend to cause the accumulation of deposits in the area of close tolerance between the shaft and the bushing.

To recapitulate, since the seal interface between the shoulder 90 and the journal 92 is established while the valve disc 64 is in the open position within the valve chamber 28 (FIG. 1), to assume that a leakage flow will occur past the seal 88 is to assume that even while the valve disc 64 is in the open position, the seal interface is not completely closed. Thus, the leakage flow from the valve chamber 28 to the gland leakoff 56 will be throttled in the area of the seal 88. Any accumulation of precipitate would thus occur within the recess regions 86A and 86B. Since, however, the exact location of such accumulation of precipitate cannot be accurately predicted, the recess 86, which is that volume that lies between the shaft 36 and the bushing 52 from the second point 82 to the third point 84 on the shaft 36, is located both to the left and to the right of the shaft seal 88, as viewed in FIG. 3, as indicated by recess regions 86A and 86B, respectively. The recess regions 86A and 86B provide a sufficient clearance volume to accommodate accumulation of phosphate buildup whether they are to occur to the left or to the right of the seal interface 88.

The shaft 36 has disposed thereon a plurality of spiral grooves 96. The grooves 96 have a sharpened edge thereon and circumscribe the shaft 36 a predetermined number of times. The grooves 96 communicate both with the valve chamber 28 and the first recess region 86A through machining releases 98 and 100, respectively.

Figure 4:
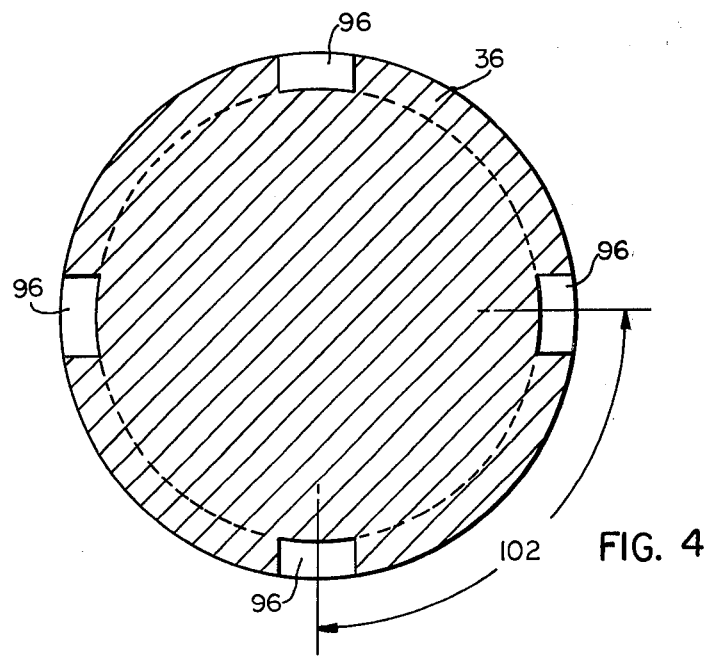
FIG. 4 is a view taken along line IV—IV in FIG. 3.

As is best seen in FIG. 4, each of the predetermined number of grooves 96 is disposed a predetermined distance 102 from each other along the surface of the shaft 36. The spiral grooves 96 provide a flow path between the valve chamber 28 and the recess 86 so that should any precipitate form in the leakage flow upstream of the shaft seal 88 will be swept by the high velocity leakage flow in the grooves 96 into the first recess region 86A. In addition, rotation of the shaft 36 through a 90° arc, that is, through an arc sufficient to move the valve disc 64 from an open to a seated position (FIG. 1) will cause the sharpened edges of the spiral grooves 96 to abrade against the first bushing 52 with a scraping action, thus removing any foreign matter precipitates which may form in the close tolerance region between the shaft 36 and the first bushing 52 and between the first point 80 and the second point 82. Any precipitate thus scraped from this close tolerance region will be conducted into the spiral groove 96 and swept by the high velocity leakage flow within the grooves 96 into the first recess region 86A.

It is thus seen that a valve utilizing a seal taught by this invention will have an improved sealing capability over valves utilizing seals taught by the prior art. If however, the seal interface taught by the present invention is not perfect, a leakage flow can be expected in the area of the seal 88 when the valve disc 64 is in the open position. However, any precipitate which does form in the area of the seal 88 will accumulate in the recess regions 86A and 86B. Precipitate which formed in the close tolerance region between the shaft 36 and the bushing 52 will be carried into the first recess region 86A by the high velocity leakage flow in the spiral groove 96. Thus it is seen that the grooves 96 acting with the first recess region 86A will provide a region wherein the accumulation of foreign matter precipitates will not be deleterious to the check valve 10. When shaft 36 is rotated through an arc of 90°, that is, through an arc sufficient to move the valve disc 64 from the open to the seated position, the sharpened edges of the spiral grooves 96 are so disposed as to scrape the entire close tolerance region between the shaft 36 and the bushing 52. Thus, any foreign matter precipitate which has not been deposited in the recess 86 will be scraped by the sharp edges of the groove 96 and conducted into the recess 86 through the spiral groove 96. It is thus seen that failures of the valve 10 to respond to a closing signal initiated by valve control means (not shown) due to the accumulation of foreign matter precipitates between the shaft 36 and the first bushing 52 are eliminated by a valve using a seal taught by this invention.

As an added feature of this shaft seal, the possibility that the valve arm collar could abrade against the spherical washer used in the prior art is eliminated. If, in the prior art, the valve collar abrades against the bushing, a large steam thrust could occur and the valve would not close in response to a closing signal from the control means. Also, the possibility of abrasion between the spherical washer and the valve collar would greatly reduce the possibility of a seal occurring at all in the prior art. A valve 10 utilizing a seal taught by this invention and having a machine release 104 disposed on the arm 60 eliminates either possibility from occurring.

A further additional feature of a valve 10 having a seal as taught by this invention is the inclusion of a flush fluid connected 106 disposed within the valve housing 12. The flush fluid connection 106 communicates with both the recess regions 86A and 86B and with the leakoff 56. It is evident that an external supply of clean steam or water can be applied to the recesses 86A and 86B thus permitting any accumulated foreign deposits which are water soluble to be so dissolved. Deposits which dissolve in the flush supply introduced into the recess regions 86A and 86B through the flush fluid connection 106 are withdrawn therefrom through the leakoff 56.

Although such a flush fluid connection 106 could not be utilized during operation of the turbine system due to the possibility of thermal distortions, provision of such a flush connection 106 would preclude the necessity of dismantling valve 10 in order to eliminate any deposits which may accumulate within the recess regions 86A or 86B. Thus, the valve 10 utilizing a seal taught by this invention can be cleaned and deposits collected within the recess regions 86A or 86B eliminated without necessitating dismantling of the valve 10. Provision of such a flush fluid connection 106 will consequently eliminate the down time necessary to clean a valve 10.

It is seen that a valve 10 having a shaft seal 88 constructed according to the teachings of this invention provides an improved seal over that utilized by the prior art. In addition, provision of a recess 86 within which the shaft seal 88 is disposed provides a useful volume in which accumulation of foreign matter precipitates can be accommodated without deleterious effects on operation of the valve 10. Also, provision of a plurality of spiral grooves 96 which communicates with the valve chamber 28 and the recess 86 provide a flow path in which any foreign matter precipitate can be conducted into the recess 86.

Provision of a flush fluid connection 106 which communicates with the recesses 86A and 86B and with the leakoff 56 provides a capability for introducing a solvent into the recess 86 for dissolving any foreign matter precipitate collected within the recess 86. Consequently, a valve 10 utilizing a seal 88 taught by this invention, can be cleaned and accumulated deposits removed without dismantling of the valve casing 12.

We claim as our invention:

1. A check valve comprising:
a valve casing,
a valve shaft rotatably disposed within said valve casing,
said casing having a first axial portion having a first predetermined tolerance fit with said shaft, said casing having a second axial portion having a second predetermined tolerance fit with said shaft, said second axial portion being contiguous with said first axial portion, said second tolerance fit being of a dimension greater than said first tolerance fit, and,
sealing means for providing a seal between said casing and said rotatable shaft, said sealing means being disposed adjacent said second axial portion of said casing,
said casing having a valve chamber defined therein and said shaft having a groove disposed on the surface thereof, said groove having a sharp edge thereon, said groove having a first end and a second end, said first end of said groove communicating with said valve chamber, and said second end of said groove being disposed on said shaft at a point other than those points on said shaft lying within said first axial portion of said valve casing.

2. The check valve of claim 1, wherein said second axial portion of said casing and said surface of said shaft define a region wherein said casing and said second axial portion of said casing are separated by a dimension equal to said second tolerance fit, and, wherein said sealing means is disposed within said region.

3. The check valve of claim 2,
wherein said second end of said groove terminates at a point on said shaft lying within said second axial portion of said casing,
wherein said valve shaft has a valve disc thereon movable from an open to a seated position, and,
wherein said sealing means are engaged within said region when said valve disc is in the open position.

4. The check valve of claim 1, wherein said second end of said groove terminates at a point on said shaft lying within said second axial portion of said casing.

5. A check valve comprising:
a valve casing having a valve chamber defined therein,
a rotatably disposed valve shaft member supported by said valve casing,
a valve disc secured to said valve shaft, said valve disc moving from an open to a seated position within said valve chamber when said shaft member is rotated a predetermined amount,
a bushing member disposed in close contact with said valve casing and said valve shaft, said bushing having a first predetermined axial portion thereon having a first predetermined close fit with said shaft, said bushing having a second axial portion thereon having a second predetermined tolerance fit with said shaft, said second axial portion of said bushing being contiguous with said first axial portion of said bushing, said second tolerance fit being of greater dimension than said first tolerance fit, said bushing and said shaft defining a recess therebetween within said second axial portion, said valve chamber adjacent to said first axial portion of said bushing, and,
sealing means for providing a seal between said valve shaft and said bushing, said sealing means being disposed within said recess,
said sealing means comprising a shoulder disposed on said valve shaft and a shoulder on said bushing corresponding to said shoulder on said shaft, said shoulder on said valve shaft abutting said shoulder on said bushing when said valve disc is in the open position, the abutment of said corresponding shoulders being disposed within said recess.

6. The check valve of claim 5, wherein said valve casing has a leakoff opening therein, said leakoff opening communicating with said recess, and,
said shaft has a groove disposed on the surface thereof, said groove communicating with said chamber and said recess, said groove having a scraping edge thereon, said scraping edge of said groove scraping against said bushing when said valve disc moves from the open to the seated position within said chamber.

7. The valve of claim 6 wherein a fluid flush connection is disposed within said valve casing, said fluid flush connection communicating with said recess and said leakoff.

8. The check valve of claim 5, wherein said valve casing has a leakoff opening therein, said leakoff opening communicating with said recess,
said valve disc being moved from the open to the seated position within said chamber when said valve shaft is rotated through an arc of 90°,
said valve shaft having a predetermined number of spiral grooves disposed on the surface thereof, said spiral grooves communicating with said chamber and with said recess, said spiral grooves having a sharpened edge thereon, said spiral grooves being disposed so that said sharpened edges of said grooves scrape against said bushing when said valve disc is moved from the open to the seated position 9. The valve of claim 8, wherein there are four spiral grooves disposed on said shaft, said spiral grooves circumscribing said shaft a predetermined number of times.

* * * * *